United States Patent
Cope (10) Patent No.: US 9,572,085 B1
(45) Date of Patent: Feb. 14, 2017

(54) USE OF FEMTOCELL REGISTRATION TO CREATE LOCAL NETWORK

(75) Inventor: Warren Cope, Olathe, KS (US)

(73) Assignee: Sprint Spectrum L.P., Overland Park, KS (US)

(*) Notice: Subject to any disclaimer, the term of this patent is extended or adjusted under 35 U.S.C. 154(b) by 2198 days.

(21) Appl. No.: 12/633,262

(22) Filed: Dec. 8, 2009

(51) Int. Cl.
H04W 4/00 (2009.01)
H04W 48/00 (2009.01)
H04W 36/00 (2009.01)

(52) U.S. Cl.
CPC ............ *H04W 48/00* (2013.01); *H04W 36/00* (2013.01)

(58) Field of Classification Search
USPC ......................................................... 370/328
See application file for complete search history.

(56) References Cited

U.S. PATENT DOCUMENTS

2008/0218196 A1    9/2008  Eckhart
2010/0093354 A1*   4/2010  Agashe et al. ............... 455/436
2010/0241711 A1*   9/2010  Ansari et al. ................ 709/205

OTHER PUBLICATIONS

Donegan, Michelle; "Femtocells Kick Apps," Jun. 24, 2009. http://www.unstrung.com/document.asp?doc_id=178423&.
Virtual Fridge Notes—http://3ginthehome.wordpress.com/2009/02/13/8virtual-fridge-notes/.
Apple Time Capsule—http://store.apple.com/us/product/MC343LL/A/Time-Capsule-1TB.

* cited by examiner

*Primary Examiner* — Gregory Sefcheck
*Assistant Examiner* — Majid Esmaeilian (57) ABSTRACT

Methods and systems are provided for a femtocell to provide local access to a remote data store. The method includes a femtocell receiving a registration request and a device identifier from a wireless communication device. Responsive to receiving the request, the femtocell may provide the wireless communication device with wireless service and may use the device identifier to cause a network share to be created on a local network to which the femtocell is coupled. The network share may then provide a second device on the local network with access to a remote data store associated with the wireless communication device. After detecting an absence or de-registration of the wireless communication device, the femtocell may remove the network share.

24 Claims, 4 Drawing Sheets

USE OF FEMTOCELL REGISTRATION TO CREATE LOCAL NETWORK

BACKGROUND

1. Cellular Wireless Networks

Many people use wireless communication devices (WCDs), such as cell phones and personal digital assistants (PDAs), to communicate with cellular wireless networks. Service providers that operate these wireless networks typically distribute WCDs to their subscribers, perhaps by selling the WCDs at retail outlets or over the Internet, or perhaps by offering WCDs at no cost to people that subscribe to a particular service plan. Service providers then typically assign each WCD a telephone directory number—often known as a mobile identification number (MIN) or mobile directory number (MDN)—under which a WCD may operate. Via a manual or over-the-air provisioning process, the service provider will cause the WCD to store its MIN in its Number Assignment Module (NAM). Furthermore, a WCD typically is provided at the time of manufacture with an electronic serial number (ESN), which identifies the WCD as a unique physical device.

These WCDs and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1×RTT networks" (or "1×networks" for short), which stands for "Single Carrier Radio Transmission Technology." Another protocol that may be used is known as Evolution Data Optimized (EV-DO), perhaps in conformance with one or more industry specifications such as IS-856. Other protocols may be used as well, such as Global System for Mobile Communications (GSM), Time Division Multiple Access (TDMA), WiMax, and/or any others.

These networks typically provide services such as voice, Short Message Service (SMS) messaging, and packet-data communication, among others, and typically include a plurality of base stations, each of which provide one or more coverage areas, such as cells and sectors. When a WCD is positioned in one of these coverage areas, it can communicate over the air interface with the base station, and in turn over one or more circuit-switched and/or packet-switched signaling and/or transport networks to which the base station provides access.

The base stations for these networks are typically not associated with any subscriber or small group of subscribers in particular; rather, they are placed in publicly-accessible locations and are used by the service provider's customers generally. These base stations collectively blanket large geographic areas with coverage; as such, they are referred to generally and herein as "macro (or macro-network) base stations" and the network they collectively form—or to which they collectively belong—is referred to generally and herein as the "macro network."

WCDs and macro base stations conduct communication sessions (e.g., voice calls and data sessions) over frequencies known as carriers, each of which may actually be a pair of frequencies, with the base station transmitting to the WCD on one of the frequencies, and the WCD transmitting to the base station on the other. This is known as frequency division duplex (FDD). The base-station-to-WCD link is known as the forward link, while the WCD-to-base-station link is known as the reverse link.

WCDs are programmed to use a pre-determined algorithm to select one of the carriers to use in communications with a base station. When a WCD is not engaged in an active communication session, the WCD does what is known as idling on the selected carrier, which means among other things that the WCD is tuned to that carrier for receiving page messages, SMS messages, and other similar messages, and that the WCD will also send access requests for call origination and other purposes to the base station on that carrier.

2. Femtocells

Many macro-network subscribers, including private consumers and businesses, among others, in addition to having wireless service (which may include data service) for their WCD (or WCDs), also have high-speed (a.k.a. "broadband") Internet access through another communication channel. This other channel may be cable-modem service, digital-subscriber-line (DSL) service, satellite-based Internet service, T1 service, and/or some other option.

In an exemplary arrangement, a user may have a cable modem connected (a) via coaxial cable to a cable provider's network and (b) via Ethernet cable to a local wireless network (e.g., IEEE 802.11 WiFi-enabled router). The router may include one or more Ethernet ports to which additional computers or other devices may also be connected, and may include wireless-access-point functionality, providing a WiFi packet-data interface to, for example, laptop computers, digital video recorders (DVRs), appliances, and/or any other computing devices or wireless network adapters.

To address gaps in macro-network coverage (e.g., in buildings and homes) and for other reasons, macro-network service providers have recently begun offering their clients devices referred to herein as femtocells.

A typical femtocell may be approximately the size of a desktop phone or WiFi access point, and is functionally a low-power, low-capacity version of a macro base station. Thus, a typical femtocell will use a normal power outlet, perhaps with a transformer providing a DC power supply. The femtocell may have a wired (e.g., Ethernet) or wireless (e.g., WiFi) connection with the user's router and/or cable modem, and would thus have connectivity to the Internet and/or one or more other packet-data networks via the user's broadband connection. The femtocell may then also have access to the devices connected to the user's router through the router's Ethernet and/or WiFi interfaces.

A femtocell may establish a virtual-private-network (VPN) connection over the Internet with an entity (e.g., a VPN terminator) on the wireless-service (macro-network) provider's core network, and thereby be able to securely communicate with the VPN terminator and other entities on that core network and beyond. The femtocell may thus provide additional functionality to WCDs it serves via access to the core network.

The femtocell also has a wireless-communication (e.g., CDMA) interface that is compatible with the user's WCD (s), such that the femtocell may act as a micro base station, providing local wireless coverage on the wireless-service provider's network via the user's Internet connection. Usually, a femtocell will provide service on a single RF carrier (or on a single carrier per technology, where multiple technologies (such as CDMA and EV-DO) are supported), and also transmit what is known as a pilot beacon, which includes administrative messages and parameters that WCDs can use to connect with the femtocell. The single RF carrier that the femtocell uses to provide service is typically different from those used by the macro network.

Femtocells may also include a Global Positioning System (GPS) receiver for receiving and decoding GPS signals for use in determination of location, as well as for use in synchronizing operations with other femtocells and with the macro network based on timing information embedded in the GPS signals.

OVERVIEW

The prevalence of global interconnected networks including, for example, the Internet, has allowed data to be transmitted and accessed across small and great distances alike. However, the actual mechanics of accessing data across interconnected networks remains complex and inconvenient, and also raises security concerns. For example, an employee of an organization who wishes to access from home data maintained at the organization must deploy and configure access mechanisms at his home computer and potentially configure additional security mechanisms in order to obtain access to the data maintained at the organization. And if the employee wishes to obtain access at additional locations, the same deployment steps must typically be executed at each additional location in order to obtain access to the data maintained at the organization. Typical remote-access mechanisms may include, for example, a VPN connection, a network drive, a network share, an encrypted or unencrypted HTTP connection, remote desktop access, or any other access mechanism that allows a user to access remotely stored data.

Additionally, allowing employees to deploy permanently available access mechanisms to their employer's network creates additional entry points for illicit activities that may impact the employer's network and, in addition, may impact the integrity of the data maintained at the employer's location. The opportunities for illicit activity increase, of course, with each additional remote location at which an employee deploys access mechanisms.

Furthermore, once an access mechanism has been deployed, it normally remains deployed until some active step is taken to remove it. For example, in regard to deployment of a VPN connection, removing the VPN access mechanism may require uninstalling a VPN client and removing all traces of access parameters used to secure the VPN connection, such as a stored username and password, particular IP address, etc.

It would thus be advantageous to provide for a seamless and automatic mechanism that, responsive to detecting a registration of a WCD associated with a user, automatically secures access to a remote data store to provide the user with local access to remote data. It would be similarly advantageous to provide for a seamless and automatic mechanism to remove access to the remote data store responsive to detecting an absence or de-registration of the previously-present WCD. A WCD may be or include a wireless cellular phone, a PDA, and/or any other electronic device that is capable of communicating with a femtocell and of carrying out the WCD functions described herein.

Methods and systems are provided herein for using a WCD's femtocell registration to trigger and enable local access to remote data. More specifically, femtocells may, responsive to detecting the registration of the user's WCD, automatically provide service to a user's WCD and obtain access to a data store associated with the user's WCD. The femtocell may then cause a network share to be created on a local network to which the femtocell is attached, the network share providing devices on the local network with access to the data store. Furthermore, and responsive to detecting a subsequent absence or de-registration of the user's WCD, the femtocell may automatically remove access to the data store from the local network by, for example, causing the removal of the network share.

In one example, a femtocell may receive a registration request from a WCD after the WCD was operating on a carrier's macro network, or perhaps after the WCD was initially powered on or brought within range of the femtocell. The WCD may then transmit a registration request to the femtocell to obtain service from the femtocell. In the registration request itself, or in a separate transmission, the WCD may also provide an identifier to the femtocell that uniquely identifies the WCD. The identifier may be, for example, a MIN or an ESN. Of course, other identifiers could also be used. Identifiers may be globally unique among all WCD's, locally unique, or may be shared among related WCDs.

In response to receiving the registration request from the WCD, the femtocell may begin providing the WCD with wireless service, perhaps on a carrier different from the macro-network carriers being used by the macro network. The femtocell may provide the service via a communication interface, which may be, for example, a cellular wireless communication interface compliant with a CDMA standard, or a WiFi wireless communication interface compliant with one or more IEEE 802.11 standards. Other wireless interfaces could also be used instead or in addition.

At the same time, or shortly after starting to provide wireless service to the WCD, the femtocell may make a determination, perhaps via a second communication interface, whether a data store associated with the WCD is available. The second interface may connect the femtocell (via a router or cable modem, for instance) with the wireless-service provider's core network. An entity in the core network may automatically detect that the femtocell is providing service to the WCD, and send a notification to the femtocell of an availability of a data store associated with the WCD.

Alternatively, the femtocell may be configured to query an entity in the core network itself, or some other entity accessible to the femtocell, to determine whether a data store associated with the WCD is available. The query may include the same identifier provided to the femtocell by the WCD, or may include some other identifier obtained using the identifier provided to the femtocell by the WCD.

If the femtocell determines that no data store associated with the WCD is available, the femtocell may take no further action, or may indicate, via an error message or other auditory and/or visual indication, an inability to access a data store associated with the WCD. The femtocell may make the determination that no data store is available by, for example, receiving an error message when attempting to query the entity in the core network. Alternatively, the entity in the core network may automatically detect that the femtocell is providing service to the WCD, and send notification of a lack of availability of a data store associated with the WCD's device identifier. And other implementations are also possible.

On the other hand, if the femtocell determines that a data store is available, the femtocell may cause a network share to be created, where the network share provides at least a second device on the local network with access to the data store. Upon determining that a data store is available, the femtocell may receive a URL indicating a network path to the data store. In some embodiments, the femtocell may, in addition to receiving the URL, further receive one or more access parameters for accessing the data store. These access parameters may be used to provide increased security, preventing unauthorized access to the data store. For example, the access parameters may include one or more of a username, a password, and decryption keys.

In one embodiment, the femtocell causing the network share to be created at the femtocell itself may involve the femtocell causing data from the remote data store to be copied to a local data store, and then creating a local network share linked to the local data store. The remote data store may reside, for example, at a node in the wireless service provider's core network. Of course, the remote data store may reside elsewhere, including, for example, the Internet or at a corporate data store location associated with a particular company or organization. The femtocell may then broadcast a message indicating the availability of the local network share over the local network. The broadcast message may be, for example, a UPnP (via the Simple Service Discovery Protocol) broadcast indicating the availability of a new file share to all devices on the local network. Of course, other device-discovery protocols could also be used, such as the Jini protocol or the Open Services Gateway initiative (OSGi). Other possibilities exist as well.

A second device on the local network receiving the broadcast message may automatically mount the network share locally, making the files available to local users of the second device. Local users of the second device may then be able to access the data locally at the second device. Access requests at the second device may be redirected by the second device to the network share at the femtocell. The femtocell itself may then fulfill the file-access requests by providing the requested data. Any changes to the files caused by access requests from the second device may be provided back to the remote data store in order to maintain data integrity at the remote data store.

In another embodiment, the femtocell causing the local network share to be created at the femtocell may, instead of copying data from the remote data store, involve the femtocell redirecting local-network-share access requests to the remote data store. Similar to the above description, the femtocell may broadcast the availability of the network share over the local network. A second device on the local network receiving the message may automatically mount the network share to make the files available to local users of the second device. Local users of the second device may then be able to access the data locally at the second device. Access requests at the second device may be redirected by the second device to the network share at the femtocell. The femtocell may then further redirect the access requests from the second device to the remote data store. Once the femtocell receives the results of the access request from the remote data store, it may redirect the results back to the second device.

In another embodiment, the femtocell causing the network share to be created at a second device on the local network may involve the femtocell sending a message to the second device, the message including the URL to the remote data store (and one or more access parameters). The message may instruct the second device to map a local network drive directly to the remote data store. In this manner, the second device may thereafter obtain access to the remote data store independent of the femtocell, without having to incur any additional overhead of transmitting requests to the remote data store via the femtocell.

In accordance with the foregoing embodiments, a user may automatically and seamlessly be provided with local access to a remote data store based on a registration with a femtocell of a WCD associated with the user. For example, an engineer who decides to work from home could be provided with automatic and seamless local access to technical data stored at his employer's location responsive to a femtocell at the engineer's home location detecting a registration of a WCD associated with the engineer. Furthermore, once the engineer left home or otherwise disabled his WCD, local access to the technical data may be removed from the home location. As a result, simplicity and security in accessing remote data may be simultaneously enhanced.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION

1. Exemplary Architecture

Figure 1:
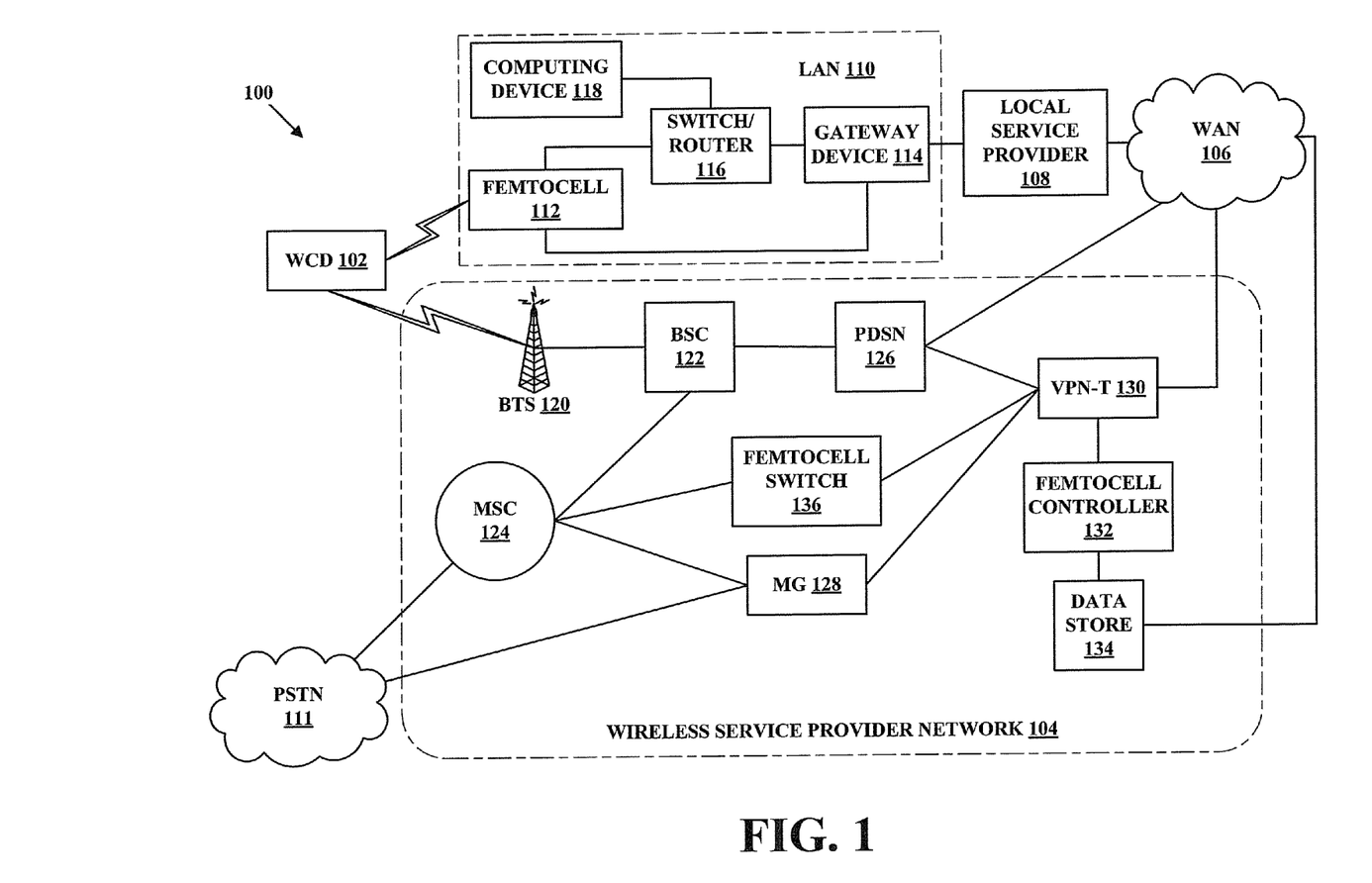
FIG. 1 is a simplified block diagram of a communication system, in accordance with exemplary embodiments.

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a wireless communication device (WCD) 102, a wireless service provider network (WSPN) 104, a Wide Area Network (WAN) 106, a local service provider 108, a local area network (LAN) 110, and a public switched telephone network (PSTN) 111. The LAN 110 includes a femtocell 112, a gateway device 114, a switch and/or router 116, and a computing device 118.

The WSPN 104 includes a macro base transceiver station (BTS) 120, a base station controller (BSC) 122, a mobile switching center (MSC) 124, a packet data serving node (PDSN) 126, a media gateway (MG) 128, a VPN terminator (VPN-T) 130, a femtocell controller 132, a data store 134, and a femtocell switch 136. Additional entities could be present without departing from the spirit of the invention, such as additional mobile stations in communication with BTS 120, additional entities in communication with WAN 106 and/or PSTN 111, etc. Also, there could be one or more devices and/or networks making up at least part of one or more communication links.

Figure 2:
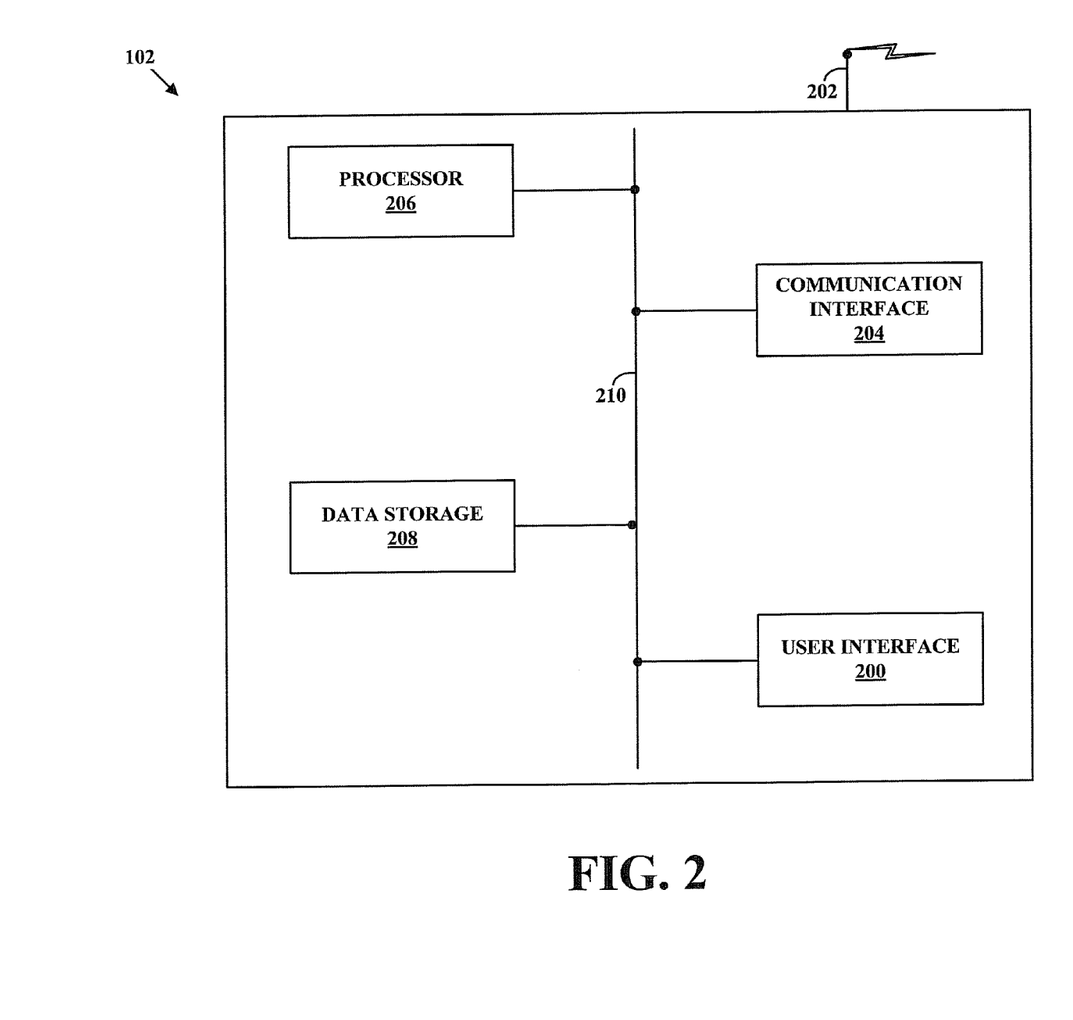
FIG. 2 is a simplified block diagram of a wireless communication device, in accordance with exemplary embodiments.

WCD 102 may be any mobile device arranged to carry out the WCD functions described herein. FIG. 2 is a simplified block diagram of a WCD 102, in accordance with an exemplary embodiment. As shown, WCD 102 may include a user interface 200, a wireless-communication interface 202/204, a processor 206, and data storage 208 comprising instructions executable by the processor 206 for carrying out WCD functions. The user interface 200 may include buttons, a touch-screen, a microphone, and/or any other elements for receiving inputs, as well as a speaker, one or more displays, and/or any other elements for communicating outputs.

The wireless-communication interface 202/204 of the WCD 102 may include an antenna 202 and a chipset 204 suitable for communicating with one or more macro base stations 108 and/or one or more femtocells 106 over suitable air interfaces. For example, the chipset 204 could be suitable for CDMA communication. The chipset 204 or wireless-communication interface 202/204 in general may also, or instead, be able to communicate with other types of networks and devices, such as EV-DO networks, WiFi networks, Bluetooth devices, and/or one or more additional types of networks and devices. The processor 206 and data storage 208 may be any suitable components known to those of skill in the art. As examples, WCD 102 could be or include a cell phone, a PDA, a computer, a laptop computer, a hybrid CDMA/EV-DO device, and/or a multi-mode cellular/WiFi device.

WSPN 104 may encompass all or some of the network elements depicted in FIG. 1 as being included in its dashed-rectangle shape. In general, there may be more and/or different communication links among entities within WSPN 104 than those set forth in FIG. 1, and there may be more and/or different connections between WSPN 104 and outside entities. Furthermore, there may be a core packet network (not depicted) making up part of WSPN 104, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s).

WAN 106 may be the well-known global packet-data network generally referred to as the Internet. However, WAN 106 may also be or include one or more other packet-data networks, without departing from the scope and spirit of the present invention. As such, WAN 106 may include one or more other wide area networks, one or more local area networks, one or more public networks, one or more private networks, one or more wired networks, one or more wireless networks, and/or one or more networks of any other type. Devices in communication with WAN 106 may exchange data using a packet-switched protocol such as the Internet Protocol (IP), and may be uniquely identified by an address such as an IP address.

LSP 108 may be any local service provider network that provides local packet-switched communications services to end-user residential or business customers and provides end-users access to the WAN 106. The LSP 108 may provide services to the end-user via data over cable service interface specification (DOCSIS), digital subscriber line (DSL), T-carrier, WiMAX, CDMA, or any other now existing or future access technologies. The LSP 108 may, for example, provide the customer (for example, a user associated with LAN 110) with the necessary electrical medium connection from the premises of the LAN 110 to the LSP's own network, and may provide the LAN 110 with one or more IP addresses that may be used to send data across the LSP's network 108 and ultimately to the WAN 106. The LSP's network 108 may comprise one or more switches, routers, dynamic host configuration protocol (DHCP) servers, firewalls, and/or other devices that operate to connect end-users to the WAN 106.

Figure 3:
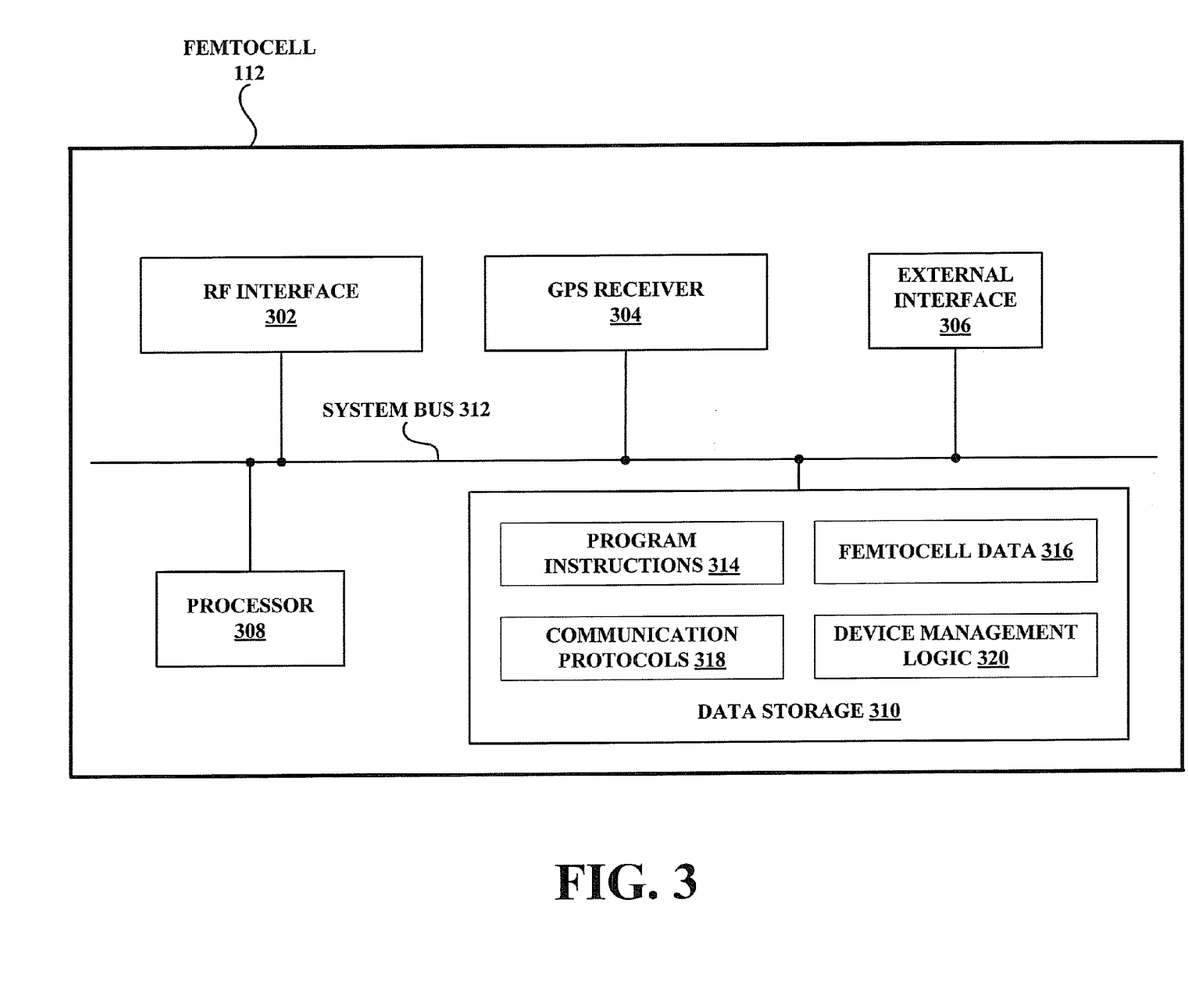
FIG. 3 is a simplified block diagram of a femtocell, in accordance with exemplary embodiments.

Femtocell 112 may be any computing and communication device arranged to carry out femtocell functions. As such, femtocell 112 may include a communication interface, a processor, and data storage comprising instructions executable by the processor for carrying out the femtocell functions described herein. FIG. 3 depicts an exemplary diagram of femtocell 112, which includes an RF interface 302, a GPS receiver 304, an external interface 306, a processor 308, and data storage 310, all communicatively linked by a system bus 312. Note that femtocell 112 could have additional and/or different components than those set forth in FIG. 3, and that this structure is provided by way of example only.

RF interface 302 may include one or more antennas, one or more chipsets, a set of one or more channel elements, and/or one or more other components suitable for providing a wireless coverage area according to a wireless-communication protocol such as CDMA (and/or one or more other wireless technologies). GPS receiver 304 may be any known or hereafter developed GPS receiver, suitable for receiving and decoding GPS signals for location and timing purposes, perhaps among other purposes. In some embodiments, a femtocell may have a location module in addition to or instead of a GPS receiver.

External interface 306 may provide a wired and/or wireless packet-data interface for communicating with a device such as a switch/router 116 or gateway device 114. Processor 308 may comprise multiple (e.g., parallel) processors, such as a general purpose microprocessor and/or a discrete digital signal processor. The data storage 310 may take various forms, in one or more parts, such as a non-volatile storage block and/or a removable storage medium, and may include (a) program instructions 314 executable by processor 308 for carrying out the femtocell functions described herein, (b) femtocell data 316, which may be any operational data or other type of data stored for use by femtocell 112, (c) communication protocols 318, facilitating and enabling communication with one or more other devices, and (d) device management logic 320, perhaps for memory and file management.

Returning to FIG. 1, gateway device 114 may be any computing and communication device arranged to connect the LAN 110 to the LSP's network 108. Gateway device 114 may include a communication interface, a processor, and data storage comprising instructions executable by the processor for carrying out at least the connecting function. The communication interface may include one or more wired and/or wireless interfaces for communicating with at least LAN 110 and LSP 108. In general, gateway device 114 connects one network (LAN 110) with another, generally upstream, network (the LSP's network 108 and ultimately the WAN 106). The gateway device 114 may also convert between those protocols supported by the LAN 110 and those supported on the link between the gateway device 114 and the LSP 108. Gateway device 114 may be embodied in, for example, a cable modem or DSL modem with gateway features. Alternatively, the gateway device 114 may not provide any gateway/routing functions alone, but may simply provide for modulation/demodulation (modem) of the data signals between the gateway device 114 and the LSP 108. In this case, the gateway device 114 may rely upon the switch/router 116 to provide gateway functionality to the devices in the LAN 110. Finally, gateway device 114 may alternatively act as a bridging device that simply bridges the LAN 110 to the LSP's network 108.

Switch/router 116 may be any computing and communication device arranged to carry out switching and/or routing functions. As such, switch/router 116 may include a plurality of communication interfaces, a processor, and data storage comprising instructions executable by the processor for carrying out switching and/or routing functions. The communication interface may include one or more wired and/or wireless interfaces for communicating with at least gateway device 114 and one or more other devices on the LAN 110. In general, the router/switch functions to support transmission of data between computing devices 118 on the LAN 110, between computing devices 118 and the femtocell 112, between computing devices 118 and the gateway device 114, and between the femtocell 112 and gateway device 114. The switch/router 116 may alternatively be incorporated within the gateway device 114 instead of being a separate device.

Computing device 118 may be any computing and communication device arranged in the LAN 110 and accessible by the femtocell 112 via the switch/router 116 and/or gateway device 114. Although only one computing device 118 is illustrated in FIG. 1, numerous computing devices could be present in the LAN 110. Computing device 118 may include a communication interface, a processor, and data storage comprising instructions executable by the processor for carrying out the various functions described herein. The communication interface may include one or more wired and/or wireless interfaces for communicating with at least femtocell 112 via switch/router 116. Instructions included in the data storage may include instructions for receiving UPnP broadcasts indicating an availability of network shares and for mapping a local logical device for obtaining access to the network share. Instructions may additionally or alternatively be provided for receiving instructions for creating a local network share at the computing device 118 that directly links to a remote data store 134. Computing device 118 may be, for example, a standalone desktop computer, a laptop, a PDA, or other electronic computing device.

Macro BTS 120 may be any network element arranged to carry out macro-BTS functions. As such, macro BTS 120 may include a communication interface, a processor, and data storage comprising instructions executable by the processor to carry out the macro-BTS functions. The communication interface may include one or more antennas, chipsets, and/or other components for providing one or more CDMA (and/or any other protocol(s)) coverage areas such as cells and sectors, for communicating with WCDs such as WCD 102 over an air interface. The communication interface may also include one or more wired (e.g. Ethernet) and/or wireless (e.g. WiFi) interfaces for communicating with at least BSC 122.

BSC 122 may be any network element arranged to carry out BSC functions. As such, BSC 122 may include a communication interface, a processor, and data storage comprising instructions executable by the processor to carry out BSC functions. The communication interface may include one or more wired and/or wireless interfaces for communicating with at least macro BTS 120, MSC 124, femtocell switch 136, and PDSN 126. In general, BSC 122 functions to control one or more macro BTSs such as macro BTS 120, and to provide those one or more macro BTSs with connections to devices such as MSC 124, femtocell switch 136, and/or PDSN 126.

Note that the combination of macro BTS 120 and BSC 122 may be considered a macro base station. However, macro BTS 120 or BSC 122 could, taken alone, be considered a macro base station as well. Furthermore, a macro base station may be considered to be either or both of those devices, and perhaps make use of one or more functions provided by MSC 124, PDSN 126, femtocell switch 136, and/or any other entity, without departing from the invention. And it should be noted that the macro network and/or the femtocell(s) described herein may operate according to CDMA, EV-DO, iDEN, TDMA, AMPS, GSM, GPRS, UMTS, EDGE, WiMAX (e.g., IEEE 802.16), LTE, microwave, satellite, MMDS, WiFi (e.g., IEEE 802.11), Bluetooth, infrared, and/or any other wireless technology or technologies now known or later developed.

MSC 124 may be any networking element arranged to carry out MSC functions. Thus, MSC 124 may include a communication interface, a processor, and data storage comprising instructions executable by the processor to carry out MSC functions. The communication interface may include one or more wired and/or wireless interfaces for communicating with at least BSC 122, femtocell switch 136, and PSTN 111. In general, MSC 124 acts as a switch between (a) PSTN 111 and one or more BSCs such as BSC 122 and/or (b) between PSTN 111 and one or more femtocells 112 via femtocell switch 136, facilitating communication between WCDs 102 and PSTN 111.

PDSN 126 may be any networking element arranged to carry out PDSN functions. As such, PDSN 126 may include a communication interface, a processor, and data storage comprising instructions executable by the processor for carrying out PDSN functions. The communication interface may include one or more wired and/or wireless interfaces for communicating with at least BSC 122, WAN 106, and VPN terminator 130. In general, PDSN 126 acts as a network access server between WAN 106 and BSCs such as BSC 122, facilitating packet-data communication between WCDs 102 and WAN 106 via macro base stations 120.

MG 128 may be any networking element arranged to carry out media-gateway functions. As such, MG 128 may include a communication interface, a processor, and data storage comprising instructions executable by the processor for carrying out media-gateway functions. The communication interface may include a circuit-switched interface and a packet-switched interface. MG 128 may (a) receive packet-based communications from within the WSPN 104, convert those to circuit-switched communications, and pass them to PSTN 111 and (b) receive circuit-switched communications from PSTN 111, convert those to packet-based communications, and pass them to another device within WSPN 104.

VPN terminator 130 may be any networking element arranged to carry out VPN-terminator functions. Thus, VPN terminator 130 may include a communication interface, a processor, and data storage comprising instructions executable by the processor for carrying out VPN-terminator functions. The communication interface may include one or more wired and/or wireless interfaces for communicating with at least femtocell controller 132, PDSN 126, femtocell switch 136, MG 128, and WAN 106. In general, VPN terminator 130 functions to establish secure VPN connections over WAN 106 with femtocells such as femtocell 112, enabling the femtocells to securely communicate with devices on the WSPN 104, such as femtocell controller 132, and perhaps beyond.

Femtocell controller 132 may be any networking element arranged to carry out femtocell-controller functions. Thus, femtocell controller 132 may include a communication interface, a processor, and data storage comprising instructions executable by the processor for carrying out femtocell-controller functions. The communication interface may include one or more wired and/or wireless interfaces for communicating with at least VPN terminator 130, along with perhaps one or more other entities on WSPN 104, and beyond.

Among other functions, femtocell controller 132 communicates via VPN terminator 130 with femtocells such as femtocell 112. Femtocell controller 132 may receive requests from various femtocells for access to a data store 134. Femtocell controller 132 may perform the requested functions via data store 134 and transmit replies to the requesting femtocell 112. Femtocell controller 132 may also be operable to select various operational parameters for femtocells (e.g. carrier, PN offset, whether to broadcast a pilot-beacon, contents of any pilot beacon to be broadcast, transmission-power level, channel-list messages, candidate carriers for pilot-beacon broadcasts), and to transmit those parameters to femtocell, perhaps along with other configuration data and messaging.

Data store 134 may be a database of data associated with one or more WCDs 102. The data store 134 may be disposed in the WSPN 104 remotely from the femtocell 112 and remotely from the LAN 110 on which the femtocell 112 resides. Although shown separately in FIG. 1, the data store 134 may otherwise be integrated with the femtocell controller 132. Alternatively, the data store 134 may be disposed outside the WSPN 104 and accessible via the WAN 106, or may be disposed within the LAN 110 or within the LSP's network 108. For example, the data store 134 may alternatively be disposed at an organization's data center, and remotely accessible to the femtocell 112 via WAN 106. When disposed inside the WSPN 104, femtocell controller 132 may provide routines for accessing and retrieving data from data store 134. When disposed outside the WSPN 104, other access and control logic may be provided for retrieving data from data store 134 in accordance with access requests from femtocells 112 and/or other devices such as computing device 118, for example.

The data store 134 may maintain a database of data associated with a plurality of users, each user associated with one or more WCDs 102. The data store 134 may organize the data in accordance with identifiers associated with each user's WCD 102. For example, data stored in data store 134 may be arranged in association with a WCD's MIN, MDN, and/or ESN. Alternatively, some other identifier could be used, such as a username associated with a WCD's 102 user or organization. And other implementations are certainly possible as well.

Femtocell switch 136 may be any networking element arranged to carry out femtocell-switch functions. As such, femtocell switch 136 may include a communication interface, a processor, and data storage comprising instructions executable by the processor for carrying out femtocell-switch functions. The communication interface may include one or more wired and/or wireless interfaces for communicating with at least MSC 124 and VPN terminator 130. In general, femtocell switch 136 acts as a switch between MSC 124 and VPN terminator 130, enabling WCDs 102 communicating via femtocells 112 to engage in calls over PSTN 111 via MSC 124.

2. Exemplary Operation a. An Exemplary Method

Figure 4:
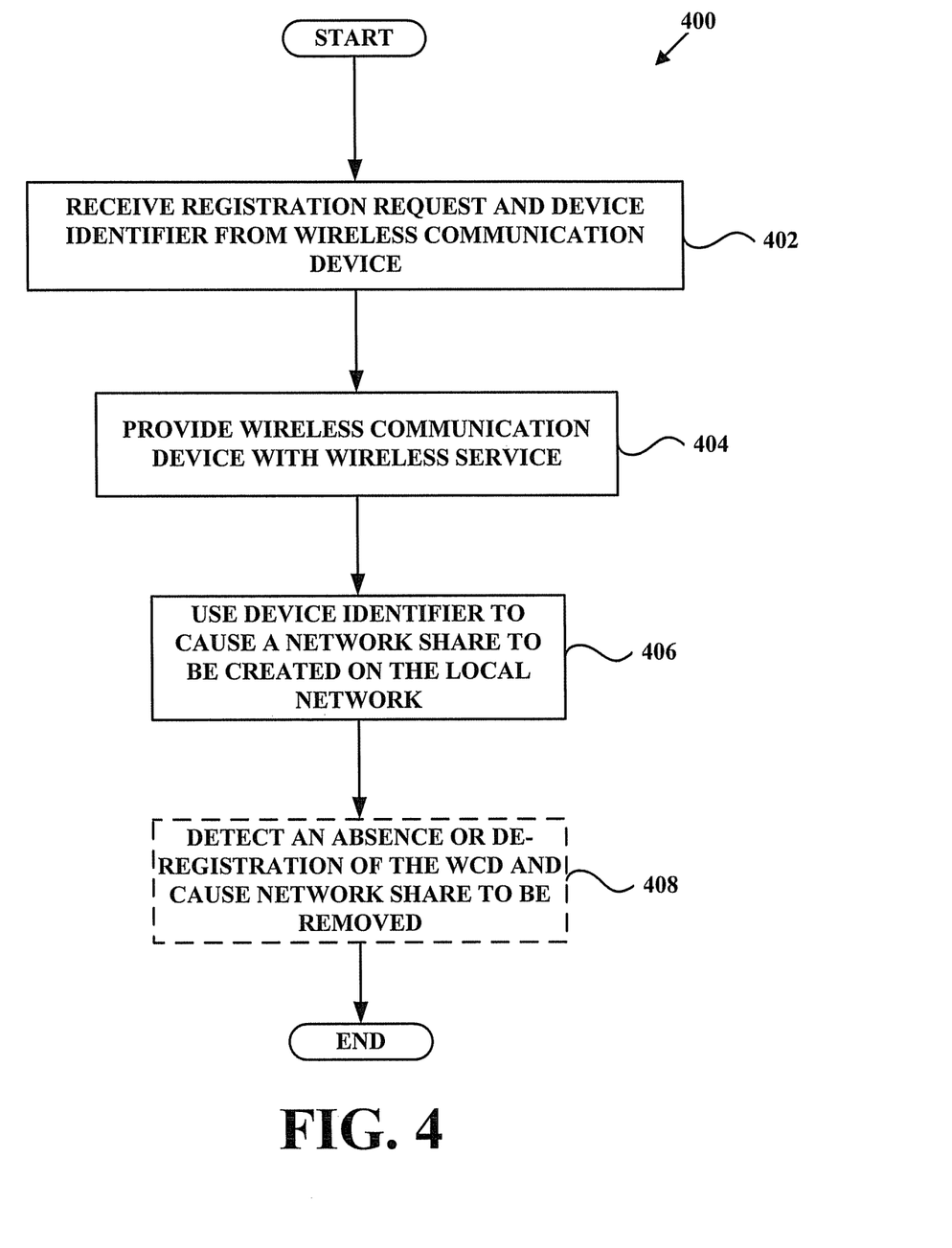
FIG. 4 is a flowchart of a method in accordance with exemplary embodiments.

FIG. 4 depicts a flowchart of an exemplary method, in accordance with an exemplary embodiment. In particular, FIG. 4 depicts a method 400 for a femtocell to use WCD registration to trigger creation of a local network share.

As shown in FIG. 4, method 400 begins at step 402, when femtocell 112 receives a registration request and device identifier from the WCD 102. At step 404, the femtocell 112 may provide the WCD 102 with wireless service. At step 406, the femtocell 112 may use the device identifier to cause a network share to be created on the local network. And at step 408, the femtocell 112 may detect an absence or de-registration of the WCD 102 and cause the network share to be removed. These steps are further described below.

i. Receive Registration Request and Device Identifier from WCD

At step 402, femtocell 112 receives a registration request and device identifier from the WCD 102. The WCD 102 may transmit the registration request after initially powering on or being brought within range of the femtocell 112 and detecting a pilot beacon being broadcast by the femtocell 112. The pilot beacon may include messages and parameters that the WCD 102 may use to initially connect with the femtocell 112 or to facilitate handoff from a macro-network carrier to the femtocell's 112 carrier, among other possibilities. The messages and parameters may inform the WCD 102 of the femtocell's carrier, and the WCD 102 may subsequently transmit the registration request to the femtocell 112 on the femtocell's carrier.

In the registration request itself, or perhaps in a separate transmission, the WCD 102 may also provide an identifier to the femtocell 112 that uniquely identifies the WCD 102. As set forth above, the identifier may be, for example, a MIN or an ESN associated with the WCD 102. Of course, other identifiers could also be used. For example, the WCD 102 may be programmed to transmit a userID identifying a user associated with the phone. Identifiers may be globally unique among all WCD's, locally unique, or may be shared among related WCDs. For example, employees working on a same project for a same organization may each be provided with WCD's having non-unique identifiers. As a result, each of the employees may be provided access to the same data store 134 due to their use of non-unique identifiers.

ii. Provide WCD with Wireless Service

At step 404, in response to receiving the registration request from the WCD 102, the femtocell 112 may begin providing WCD 102 with wireless service on the femtocell's carrier. The femtocell 112 may provide the service via a communication interface, which may be, for example, a cellular wireless communication interface compliant with a CDMA standard, or a WiFi wireless communication interface compliant with the IEEE 802.11 standard. Other wireless interfaces could also be used, instead or in addition.

The service provided to the WCD 102 may be voice service, data service, or some combination thereof. By providing the WCD 102 with access to the WSPN 104, the femtocell enables the WCD 102 to initiate voice calls via PSTN 111 and data connections via PDSN 126.

iii. Use Device Identifier to Cause a Network Share to be Created on the LAN

A. Obtaining Information to Access the Data Store

At step 406, the femtocell 112 uses the device identifier to cause a network share to be created on the LAN 110. At the same time, or perhaps shortly after starting to provide wireless service to the WCD 102, the femtocell 112 may determine parameters for accessing a data store 134 associated with the WCD 102. Information required to access the data store may include network path information to reach the data store 134, access parameters to access the data store 134, and/or decryption keys to decrypt data retrieved from the data store. Other and/or different information may also be identified and used.

As part of the process of obtaining this information, the femtocell 112 may first obtain authorization from the WCD 102 prior to creating the network share. Authorization may be granted in the initial registration request sent by the WCD 102. Alternatively, a separate authorization process may be initiated at the WCD 102 by the femtocell 112 sending a message to the WCD 102 on a forward channel over the femtocell's carrier instructing the WCD 102 to request authorization from a user of the WCD 102. The WCD 102 may then request authorization from the user via its user interface 200. The request may take the form of, for example, a dialog box including a request for authorization to access the data store 134 and including a GUI option to the user to provide the authorization or deny the authorization. The WCD 102 may then provide the user's response to the femtocell 112 in a message transmitted via a reverse channel over the femtocell's carrier. The femtocell 112 may condition further action upon receipt of the message providing authorization.

Furthermore, the authorization process could further include the femtocell 112 transmitting a request to the WCD 102 for access parameters for accessing the data store 134, including, for example, a username, password, and/or a decryption key. The request for access parameters may be included in the initial authorization request message, or in a separate message. Other possibilities exist as well. Of course, the step of obtaining authorization could just as well occur at other points in the process, such as after obtaining information to access the data store 134.

Assuming no authorization process is implemented, or that an authorization process is implemented and authorization has been granted (and any necessary access parameters provided), the femtocell 112 may obtain network path information for accessing the data store 134. In one embodiment, the femtocell 112 may be pre-programmed with methods for inferring network path information for accessing the data store 134 relative to the device identifier received from the WCD 102. For example, the device identifier received by the femtocell 112 may be used to directly index into the data store 134 at a pre-determined network location. This configuration may be best utilized in any environment where the data store 134 is disposed in and under control of a pre-determined trusted entity, such as the WSPN 104 in FIG. 1. In one example, if the known IP address of the data store 134 is 128.129.130.131 and the received identifier from the WCD 102 is an MIN of 847-555-5555, the femtocell could determine that the data store 134 associated with the WCD 102 can be accessed at the network location of "128.129.130.131/847-555-5555/." Of course, instead of an IP address, a URL could also be used.

Instead of implementing a fixed indexing method, the femtocell 112 may use the received device identifier to query a separate database to retrieve parameters for accessing the data store 134 associated with the WCD 102. In this manner, the separate database may include different IP addresses and/or different indexes for each identifier, and thus provide for increased flexibility in accessing remote data stores. The query to the separate database may include the same identifier provided to the femtocell 112 by the WCD 102, or may include some other identifier obtained using the identifier provided to the femtocell 112. The separate database may respond to the query with network path information for accessing the data store 134 associated with the WCD 102, and may further provide additional access parameters such as decryption keys to use in accessing the data store 134.

Alternatively, the femtocell 112 may be provided with information by the WSPN 104 for accessing the data store 134 associated with the WCD 102. An entity in the core network may automatically detect that the femtocell 112 is providing service to the WCD 102, and send a notification to the femtocell 112 of availability of the data store 134 associated with the WCD's 102 device identifier. The entity in the core network may include the femtocell controller 132 or the MSC 124, for example. Other entities in the WSPN 104 could also perform the function. The notification may include the network path information for accessing the data store 134 and/or additional access parameters such as decryption keys to use in accessing the data in the data store 134.

If the femtocell 112 determines that no data store associated with the WCD 102 is available, the femtocell 112 may take no further action, or may indicate, via an error message or other auditory and/or visual indication, an inability to access a data store associated with the WCD 102. The indication may be initiated at the WCD 102 by the femtocell 112 sending a message to the WCD 102 on a forward channel over the femtocell's carrier, instructing the WCD 102 to provide the indication to the user of the WCD 102. The WCD 102 may then provide the indication via its user interface 200. In response, the WCD 102 may provide the user with an opportunity to re-attempt the process, which may include the WCD 102 sending one or more retry requests to the femtocell 112.

The femtocell 112 may make the determination that no data store is available by, for example, receiving an error message when attempting to query the separate database or when attempting to access the determined index at the fixed network address. Alternatively, the WSPN 104 may automatically detect that the femtocell 112 is providing service to the WCD 102, determine the lack of availability of a data store itself, and send notification of the lack of availability to the femtocell 112. Other implementations are also possible.

On the other hand, if the femtocell 112 determines that a data store 134 is available, the femtocell 112 may cause a network share to be created, where the network share provides at least computing device 118 on the LAN 110 with access to the data store 134.

B. Creating a Network Share on the LAN

Perhaps after determining that a data store associated with the WCD 102 is available, the femtocell 112 may begin the process of creating a network share on the LAN 110. As set forth above, either automatically or in response to a query, the femtocell 112 obtains network path information indicating a network path to the data store 134, possibly among several additional access parameters. These additional access parameters may be used to provide increased security, preventing unauthorized access to the data store. For example, the additional access parameters may include one or more of a username, a password, or decryption keys, among other parameters.

In one embodiment, the femtocell 112 may cause the network share to be created at the femtocell 112 itself. This process may involve the femtocell 112 causing data from the remote data store 134 to be copied to a local data store within the femtocell 112 or attached to the femtocell 112, and then creating a local network share linked to the local data store.

The file transfer connection between the femtocell 112 and the data store 134 may be based on the file transfer protocol (FTP), the Hypertext Transfer Protocol (HTTP), or any other known or future developed file transfer protocol.

The femtocell 112 may then broadcast a message indicating the availability of the local network share over the local network. The broadcast message may be, for example, a UPnP (via the Simple Service Discovery Protocol—SSDP) broadcast indicating the availability of a new file share to all devices on the local network. For example, the broadcast may take the form of a User Datagram Protocol (UDP) packet multicast on the LAN 110 using a multicast address of 239.255.255.250, in accordance with the SSDP protocol. Of course, other device-discovery protocols could also be used.

Assuming that the computing device 118 supports the particular device-discovery protocol used by the femtocell 112 to broadcast the availability of the network share, the computing device 118 may then mount the network share locally, making the files available to local users of the computing device 118. Local users of the computing device 118 may then be able to access the data copied from the data store 134 just as the data was available locally at the computing device 118. Access requests at the computing device 118, perhaps generated by a user, may be redirected by the computing device 118 to the network share at the femtocell 112. The femtocell 112 itself may then fulfill the requests by providing the requested data. Any changes to the files at the femtocell 112 caused by access requests from the computing device 118 may be provided back to the data store 134 in order to maintain data integrity at the data store 134. The same connection used to originally copy the files from the data store 134 to the femtocell 112 may be used to transfer any modified files (or all files) back to the data store 134. Alternatively, a new connection could be created using the same or different file transfer protocol.

In another embodiment, the femtocell 112 may, instead of copying data from the data store 134, simply redirect local network share access requests to the data store 134. Similar to the above, the femtocell 112 may broadcast the availability of the network share over the local network, perhaps via a UPnP broadcast message. The computing device 118 may receive the message and responsively mount the network share locally to make the files available to local users of the computing device 118. Local users of the computing device 118 may then be able to access the data locally at the computing device 118. Access requests at the computing device 118 may be redirected by the computing device 118 to the network share at the femtocell 112. The femtocell 112 may then further redirect the access requests to the data store 134 via a file transfer connection. Once the femtocell 112 receives the results of the access request from the data store 134, the femtocell 112 may redirect the results back to the computing device 118 to fulfill the original request.

In another embodiment, the femtocell 112 may cause the network share to be created at the computing device 118. The femtocell 112 may accomplish this by sending a message to the computing device 118, the message including the network path information for accessing the data store 134 (and any retrieved access parameters). The message transmitted to the computing device 118 may instruct the computing device 118 to map a local network drive directly to the data store 134. The computing device 118 may receive the message and responsively mount the network share locally to make the files available to local users of the computing device 118. Local users of the computing device 118 may then be able to access the data locally at the computing device 118. Access requests at the computing device 118 may be redirected by the computing device 118 to the remote data store 134 via the switch/router 116 and gateway device 114. The computing device 118 may then directly receive the results of the access request from the data store 134 without involving the femtocell 112. The connection between the computing device 118 and the data store 134 may be a file transfer connection. In this manner, the computing device 118 may obtain access to the data store 134 independent of the femtocell 112, without having to incur any additional overhead of transmitting requests to the data store 134 via the femtocell 112.

iv. Detect an Absence or De-Registration of the WCD and Cause the Network Share to be Removed At optional step 408, the femtocell 112 may detect an absence or de-registration of the WCD 102 and cause the network share to be removed. As part of the communication standard for CDMA and many other wireless communication protocols, the WCD 102 may be informed of a re-registration period by the femtocell 112 when the WCD 102 registers with the femtocell 112 for service. The re-registration interval specifies a time period in which the WCD 102 must transmit a re-registration request to the femtocell 112. Failure to transmit the re-registration request within the specified re-registration interval may result in the femtocell 112 discontinuing service to the WCD 102. Accordingly, the femtocell 112 may include a timer to track the re-registration interval of the WCD 102. If the timer expires without the femtocell 112 receiving a re-registration request, the femtocell 112 may assume that the WCD 102 has powered down or left the area, and determine that the WCD 102 is absent. The femtocell 112 may then discontinue service to the WCD 102.

Of course, the WCD 102 could also proactively indicate to the femtocell 112 that it is either discontinuing service (e.g., powering down), or that it is handing off service to another provider (e.g., the macro network) by actively de-registering with the femtocell 112.

After detecting the absence or de-registration of the WCD 102, either through expiration of the re-registration interval, receipt of a proactively indication from the WCD 102, or in some other manner, the femtocell 112 may cause the local network share to be removed.

In the event that the network share was created at the femtocell 112, the femtocell 112 may simply remove the network share, and reject any future request to access the network share generated by other devices in the LAN 110. Alternatively or additionally, the femtocell 112 may announce to the LAN 110 that the network share has become unavailable, causing the devices in the LAN 110, including the computing device 118, to remove any network shares that link to the femtocell 112. And other implementations are possible as well.

In the event that the network share was created at the computing device 118, the femtocell 112 may transmit a message to the computing device 118 instructing the computing device 118 to remove the network share directly linking the computing device 118 to the data store 134. In order to ensure removal of the share, the femtocell 112 may be configured to re-transmit the request until a confirmation message is received from the computing device 118 indicating successful removal of the network share.

3. Conclusion

In accordance with the foregoing embodiments, a user may automatically and seamlessly be provided with local access to a remote data store as a result of a registration with a femtocell of a WCD associated with the user. Furthermore, access to the remote data store may automatically and seamlessly be removed once the femtocell detects an absence or de-registration of the WCD. As a result, simplicity and security in accessing remote data may be simultaneously enhanced.

Various exemplary embodiments have been described above. Those skilled in the art will understand, however, that changes and modifications may be made to those examples without departing from the scope of the claims.

The invention claimed is:

1. A method for a femtocell to provide local access to a remote data store, the method comprising:
a femtocell receiving a registration request and a device identifier from a wireless communication device; and
responsive to receiving the request, the femtocell (i) providing the wireless communication device with wireless service and (ii) using the device identifier to cause a network share to be created on a local network to which the femtocell is coupled, the network share providing a second device on the local network with access to a remote data store associated with the wireless communication device.

2. The method of claim 1, wherein the femtocell accesses the remote data store via a gateway device.

3. The method of claim 1, wherein the femtocell accesses the remote data store via a wireline interface to the local network, and communicates with the second device via a wireless interface to the local network.

4. The method of claim 1, wherein the femtocell using the device identifier to cause the network share to be created comprises the femtocell (i) transferring data from the remote data store to a local data store, (ii) creating a local network share linked to the local data store, and (iii) broadcasting over the local network the availability of the local network share.

5. The method of claim 1, wherein the femtocell using the device identifier to cause the network share to be created comprises the femtocell (i) creating a local network share at the femtocell that redirects local-network-share access requests to the remote data store and (ii) broadcasting the availability of the network share over the local network.

6. The method of claim 5, wherein broadcasting the availability of the network share comprises broadcasting a UPnP advertisement to a multi-cast address.

7. The method of claim 1, wherein the femtocell using the device identifier to cause the network share to be created comprises retrieving a URL indicating a network path to the remote data store.

8. The method of claim 7, wherein the femtocell using the device identifier to cause the network share to be created further comprises the femtocell sending a message to the second device on the local network, the message (i) including the URL and (ii) instructing the second device to map a local network drive to the remote data store.

9. The method of claim 7, further comprising the femtocell (i) retrieving at least one access parameter for accessing the remote data store at the location indicated by the URL, the at least one access parameter being selected from the group consisting of a username, a password, and decryption keys and (ii) using the at least one access parameter in creating the local network share.

10. The method of claim 1, wherein the femtocell using the device identifier to cause the network share to be created comprises the femtocell (i) transmitting an authorization request to the wireless communication device and (ii) receiving an authorization response from the wireless communication device.

11. The method of claim 1, further comprising the femtocell, responsive to detecting an absence or de-registration of the WCD, causing the network share to be removed from the local network.

12. The method of claim 1, wherein the femtocell using the device identifier to cause the network share to be created comprises the femtocell determining whether a data store associated with the WCD is available.

13. A femtocell comprising:
a communication interface;
a processor; and
data storage containing instructions executable by the processor for causing the femtocell to carry out steps including:
receiving a registration request and a device identifier from a wireless communication device; and
responsive to receiving the request, (i) providing the wireless communication device with wireless service and (ii) using the device identifier to cause a network share to be created on a local network to which the femtocell is coupled, the network share providing a second device on the local network with access to a remote data store associated with the wireless communication device.

14. The femtocell of claim 13, wherein the femtocell accesses the remote data store via a gateway device.

15. The femtocell of claim 13, wherein the femtocell accesses the remote data store via a wireline interface to the local network, and communicates with the second device via a wireless interface to the local network.

16. The femtocell of claim 13, wherein using the device identifier to cause the network share to be created comprises (i) transferring data from the remote data store to a local data store, (ii) creating a local network share linked to the local data store, and (iii) broadcasting over the local network the availability of the local network share.

17. The femtocell of claim 13, wherein using the device identifier to cause the network share to be created comprises (i) creating a local network share at the femtocell that redirects local-network-share access requests to the remote data store and (ii) broadcasting the availability of the network share over the local network.

18. The femtocell of claim 17, wherein broadcasting the availability of the network share comprises broadcasting a UPnP advertisement to a multi-cast address.

19. The femtocell of claim 13, wherein using the device identifier to cause the network share to be created comprises retrieving a URL indicating a network path to the remote data store.

20. The femtocell of claim 19, wherein using the device identifier to cause the network share to be created further comprises sending a message to the second device on the local network, the message (i) including the URL and (ii) instructing the second device to map a local network drive to the remote data store.

21. The femtocell of claim 19, wherein using the device identifier to cause the network share to be created further comprises (i) retrieving at least one access parameter selected from the group consisting of a username, a password, and decryption keys for accessing the remote data store at the location indicated by the URL and (ii) using the at least one access parameter in creating the local network share.

22. The femtocell of claim 13, wherein using the device identifier to cause the network share to be created comprises (i) transmitting an authorization request to the wireless communication device and (ii) receiving an authorization response from the wireless communication device.

23. The femtocell of claim 13, the data storage containing instructions executable by the processor for causing the femtocell to carry out the additional steps of (i) detecting an absence or de-registration of the WCD and (ii) responsively causing the network share to be removed from the local network.

24. The femtocell of claim 13, wherein using the device identifier to cause the network share to be created comprises determining whether a data store associated with the WCD is available.

* * * * *